US 6,568,384 B1

United States Patent
Onizaki

(10) Patent No.: US 6,568,384 B1
(45) Date of Patent: May 27, 2003

(54) SEMICONDUCTOR MATERIAL CUTTING AND PROCESSING METHOD

(75) Inventor: Kazunori Onizaki, Saga Prefecture (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 0 days.

(21) Appl. No.: 09/587,896

(22) Filed: Jun. 6, 2000

(30) Foreign Application Priority Data

Jun. 8, 1999 (JP) ............................ 11-161014

(51) Int. Cl.$^7$ ................................ B28D 1/06
(52) U.S. Cl. ...................... 125/16.02; 125/21
(58) Field of Search ................ 125/12, 16.01, 125/16.02, 21

(56) References Cited

U.S. PATENT DOCUMENTS 4,287,869 A * 9/1981 Schmid .................... 125/16 R
5,817,711 A * 10/1998 Kambe et al. ............. 524/501
6,178,962 B1 * 1/2001 Ohashi et al. ............ 125/16.01
6,228,816 B1 * 5/2001 Ito et al. .................. 508/143
6,295,977 B1 * 10/2001 Ripper et al. ............ 125/16.02

FOREIGN PATENT DOCUMENTS

JP 411042548 A * 2/1999 ........... B24B/27/06

* cited by examiner

Primary Examiner—Dung Van Nguyen
(74) Attorney, Agent, or Firm—Breiner & Breiner, L.L.C.

(57) ABSTRACT

The present invention is a cutting and processing method for cutting semiconductor materials such as silicon ingots, or machining grooves therein, using a wire saw, a purpose whereof is to obtain a method wherewith high-precision processed products can be stably obtained. By performing cutting processing using a slurry that is either a mixture of free abrasive particles and an oil base such as a mineral oil or a mixture of free abrasive particles and an aqueous solution base such as ethylene glycol material, the effects of improving cuttability, reducing residual processing distortion, suppressing process stress, and suppressing cutting heat can be enhanced, and it is possible to carry on cutting while eliminating the process stress (residual distortion) produced by cutting, and thus to cut low-distortion wafers.

3 Claims, 1 Drawing Sheet

SEMICONDUCTOR MATERIAL CUTTING AND PROCESSING METHOD

BACKGROUND OF THE INVENTION

1. Field of the Invention

This invention relates to improvements in a cutting and processing method that uses a wire saw for cutting such hard and brittle materials as ceramics and silicon used in the manufacture of semiconductor devices. The present invention further relates to a semiconductor material cutting and processing method wherewith, by performing the cutting using wire in which abrasive particles are made to adhere to the outer circumference of a core wire, and using either a slurry that is a mixture of free abrasive particles and an oil base or aqueous solution base, or an alkaline solution, the total thickness variation (TTV) in the wafers obtained can be diminished, the residual processing distortion reduced, the process stress suppressed, and the cutting heat suppressed.

2. Description of the Prior Art

In manufacturing wafers that are semiconductor substrate materials, wire saw cutting apparatuses that cut the wafers with traveling wires from a cylindrical silicon monocrystal ingot are widely used.

To describe an example configuration of a wire saw cutting apparatus used for cutting silicon monocrystal ingots, as diagrammed in FIG. 1, for example, a wire is deployed so that it is wound parallel, at a constant interval, about the outer circumferences of three horizontally placed long rollers, and wire fed from one wire bobbin is taken up on another wire bobbin after it has traveled around the outer circumferences of the rollers.

With the wire segments arrayed in the axial direction between the two upper rollers at a constant interval and traveling in the same direction, the silicon monocrystal ingot is secured in a jig, and the jig, in a condition wherein it is mechanically held by a separate holding mechanism, is lowered so that the monocrystal ingot is pressed against the wire segments, and cut. In addition to those which lower the monocrystal ingot, there are also configurations which cut the ingot by pressing it against the wire segments while raising it.

One of the methods of using a wire saw cutting apparatus having the structure described above is a method that employs free abrasive particles, performing the cutting while supplying to both ends of the cut surfaces on a slurry wherein a certain quantity of polishing powder is mixed into an oil or aqueous base (Japanese Utility Model Application Laid-Open No. S57-193349/1982). There is also a method that employs adhering abrasive particles, wherewith the ingot is directly cut using a wire wherein abrasive particles are secured by a bonding agent to a wire filament or metal-deposited thereto (Japanese Patent Application Laid-Open No. H11-42548/1999).

Also proposed, with the object of reducing post-cutting residual distortion, is a method of cutting that uses a nylon, polyester, or other resin filament instead of the metal wire noted above, or such a resin filament which has been reinforced with carbon or glass fiber, using simple water as the coolant fluid (Japanese Patent Application Laid-Open No. H8-126953/1996).

Because work consisting of brittle material is cut with wire consisting of piano wire of high tensile strength and hardness, when the cutting is done using adhering abrasive particles, the process stress generated is great, wherefore there is a problem in that residual process distortion becomes great.

In the case of cutting using free abrasive particles, there are a number of problems, such as that the work environment is made poor by the slurry used splashing about, as that the roughness of cut surfaces is poor because cutting is done while carrying the slurry on the wire, and as that variation in wafer thickness occurs depending on the amount of slurry carried in.

The methods that use a resin filament are not necessarily methods that are outstanding in industrial production applications in terms of cutting process efficiency.

SUMMARY OF THE INVENTION

An object of the present invention is to provide a cutting and processing method for semiconductor materials that either cuts semiconductor materials such as silicon ingots, or makes grooves therein, using a wire saw, wherewith there is little residual process distortion after cutting, and wherewith high-quality, high-precision processed products exhibiting outstanding thickness precision can be stably obtained.

The inventor conducted various investigations with the object of devising a cutting method capable of suppressing the occurrence of residual process distortion in order to resolve the problem of the unavoidable occurrence of residual process distortion in processed products after cutting with conventional wire saws that use wires to which abrasive particles adhere to the outer circumference of a core wire, as described in the foregoing. As a result, the inventor discovered that by cutting with a wire to which fixed abrasive particles adhere while concurrently using a specific slurry, the process stress occurring at the time of fixed abrasive particle cutting is cancelled out by the wrapping effect produced by the slurry, making low-distortion process cutting possible.

The inventor also discovered that by performing cutting processing using a mixture of free abrasive particles and an oil base such as mineral oil in the slurry, the effects of enhancing cuttability, reducing residual process distortion, and suppressing process stress are high, and that by performing cutting processing using a mixture of free abrasive particles and an aqueous solution base such as PEG (polyethylene glycol material) therein, the effects of enhancing cuttability, reducing residual process distortion, suppressing process stress, and suppressing cutting heat are high.

The inventor further discovered that wafers exhibiting low distortion can be obtained by performing cutting while eliminating the process stress generated during cutting (residual distortion), by cutting an ingot while applying thereto an alkaline solution of KOH or NaOH generating 2% or lower process stress during cutting, and thus the present invention was perfected.

As based on the present invention, in a cutting and processing method based on a wire saw wherein abrasive particle treated wire wherein abrasive particles have been made to adhere to a core wire is used, it becomes possible to conduct low-distortion cutting and processing using the wrapping effect realized by cutting and processing using a slurry containing free abrasive particles, to counteract the process stress (residual distortion) generated in the cutting and processing, and low-distortion process cutting like that described above becomes possible by applying an alkaline solution, whereupon the process cost (process volume) in subsequent processing can be reduced.

In a cutting and processing method based on a wire saw using conventional abrasive particle treated wire, there are only the fixed abrasive particles, wherefore cutting tends to be done while having a damage layer below the wafer surface, and the process volume tends to become great in subsequent processes such as wrapping.

With the method of the present invention, however, as to the damage that occurs with cutting, the residual distortion becomes very slight, due to the fact that a wrapping effect is employed or selective etching is performed, and it becomes possible to sharply reduce process costs in subsequent processing. Another advantage realized is that TTV at the cut surfaces becomes small.

DETAILED DESCRIPTION OF THE PREFERRED EMBODIMENTS

Figure 1:
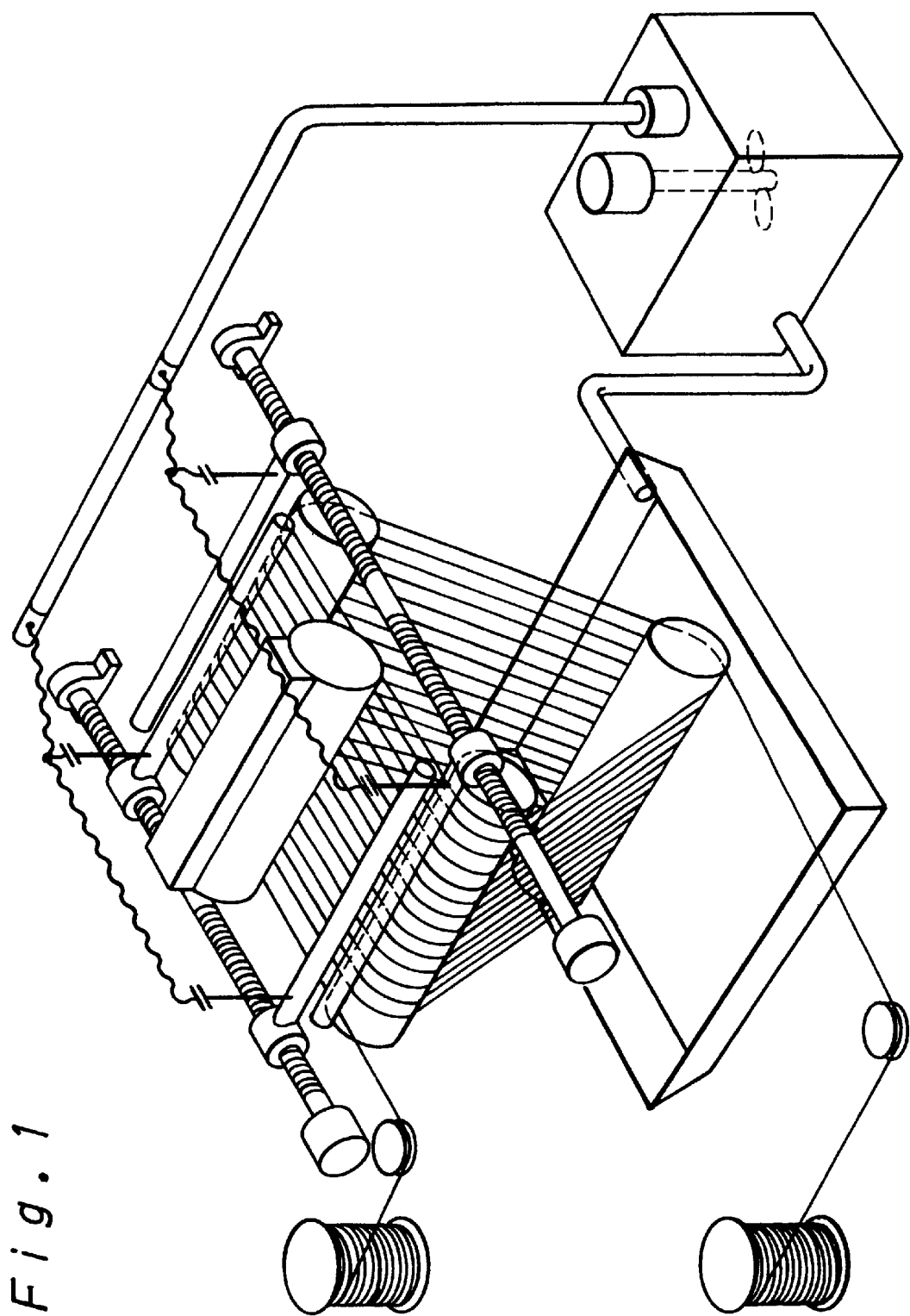
FIG. 1 is an explanatory diagram showing an example configuration of a conventional wire saw apparatus.

In the present invention, the wire that has abrasive particles made to adhere to the outer circumference of the core wire by a bonding agent, or metal deposited thereto, should preferably be wire to which adheres carborundum, diamond, or SiC, etc., having an abrasive particle size of #100 to #6000.

In the present invention, the slurry is a mixture of free abrasive particles and an oil base or aqueous solution base. The oil base used is a mineral oil in which a dispersant and thickener, etc., have been mixed. The aqueous solution base used is an aqueous solution base wherein various additives have been added to 30 to 80% water or PEG. SiC, GC, or BC, etc., is used as the free abrasive particles. For SiC, that which is equivalent to #600 to #1000 is preferable.

A preferable slurry is a mixture of a solution wherein a mineral oil is the base to which SiC has been added, with the mixture ratio preferably within a range of base:SiC=1:1 to 1:1.3. The preferable mixture ratio for a mixture wherein SiC is added to an aqueous base containing 30 to 80% water or PEG is base:SiC=1:1 or the range 0.8 to 0.9:1.

In the present invention, a KOH solution or NaOH solution is preferable for the alkaline solution, and the solution used may have a concentration of 2% or lower.

In the present invention, for the method of carrying the slurry into the cut surfaces of the semiconductor material, a method can be adopted wherein the position of supply from a slurry pipe is varied, or the flow volume from a pump is varied, so that the quantity of slurry carried in from the beginning of cutting to the end of cutting is made constant, depending on the length of contact between the material and the wire.

By using multiple pairs of slurry nozzles and arranging the directions of slurry feed therefrom so that they mutually intersect, even should the tip portion of the main supply pipeline become clogged, the insufficiency of supply resulting from that clogging and the portions wherein irregularity occurs are augmented by secondary pipelines, stable slurry supply is effected, and high-precision wafer manufacture is made possible.

EXAMPLES

Example 1

First, an uncut ingot is prepared which is a monocrystalline ingot having an outer diameter of 6 to 12 inches, bonded to a contact plate and attachment jig, and this is loaded on the wire saw apparatus. Next, a wire wherein diamond abrasive particles have been made to adhere to the surface of the wire is wound about (a) main roller(s) and cutting preparations are made.

The slurry was prepared by introducing an oil agent having a mineral oil as its base, and SiC having a particle size equivalent to #600 to #1000 into a slurry tank so that the mixture ratio became base:SiC=1:1. This slurry was made to flow from slurry nozzles in a curtain pattern, and cutting was done by making the wire with the abrasive particles on it travel in both directions at high speed in that slurry curtain.

When the cut surfaces cut by the abrasive particle treated wire was examined, it was verified that they were cut surfaces such as that wrapping was done by slurry containing abrasive particles. The depth of the residual distortion layer in the cut surfaces was 7 to 15 $\mu$m.

Example 2

Using the wire saw apparatus of Embodiment 1, wire wherein SiC abrasive particles had been made to adhere to the wire surface was wound about the main roller(s) and cutting preparations were made, and the slurry was prepared by introducing PEG and SiC having a particle size equivalent to #600 to #1000 into the slurry tank so that the mixing ratio became PEG:SiC=1:1.

This slurry was made to flow from the slurry nozzles in a curtain pattern, and a 12-inch monocrystalline ingot was cut while causing the abrasive particle treated wire to travel at high speed in both directions therein. When the cut surfaces were examined, it was verified that they were cut surfaces such as that wrapping was done by slurry containing abrasive particles. The depth of the residual distortion layer in the cut surfaces was 7 to 15 $\mu$m.

Example 3

Using the wire saw apparatus of Embodiment 1, wire wherein SiC abrasive particles had been made to adhere to the wire surface was wound about the main roller(s) and cutting preparations were made. For the slurry, only an alkaline aqueous solution of KOH having a concentration of 2% was used. This slurry was made to flow from the wire saw slurry nozzles, and cutting was done while administering this to the abrasive particle treated wire, and while spraying the aqueous solution onto the ingot at the places where the cuts were being made.

When the cut surfaces were examined, the same properties were observed as in wafers selectively etched with the same alkaline solution. The depth of the residual distortion layer in the cut surfaces was 5 $\mu$m or less.

Comparative Example 1

Using the wire saw apparatus of Embodiment 1, when monocrystalline ingots having an outer diameter of 6 to 12 inches were cut with a wire to which diamond abrasive particles had been made to adhere, the depth of the residual distortion layer in the cut surfaces was 10 to 20 $\mu$m.

What is claimed is:

1. A semiconductor material cutting and processing method comprising:
   providing an alkaline solution,
   applying said alkaline solution to a wire of the wire saw having abrasive particles, and
   cutting a semiconductor material with said wire while applying said alkaline solution.
2. A semiconductor material cutting and processing method in accordance with claim 1 wherein said alkaline solution is potassium hydroxide or sodium hydroxide.
3. A semiconductor material cutting and processing method in accordance with claim 1 wherein said alkaline solution has a concentration of 2% or lower.

* * * * *

UNITED STATES PATENT AND TRADEMARK OFFICE
CERTIFICATE OF CORRECTION

PATENT NO. : 6,568,384 B1
DATED : May 27, 2003
INVENTOR(S) : Kazunori Onizaki

It is certified that error appears in the above-identified patent and that said Letters Patent is hereby corrected as shown below:

<u>Column 4,</u>
Line 55, after "solution" insert -- free of abrasive particles --.
Lines 56 and 57, insert -- providing a wire saw comprising a wire having abrasive particles adhered to the wire, --.
Line 58, replace lines 56 and 57 with the following:
-- applying said alkaline solution to the wire of the wire saw, and --.

Signed and Sealed this

Ninth Day of September, 2003

JAMES E. ROGAN
*Director of the United States Patent and Trademark Office*